Dec. 31, 1940.  E. J. HEFELE  2,226,929
DIRECTION FINDING SYSTEM
Filed Oct. 23, 1936
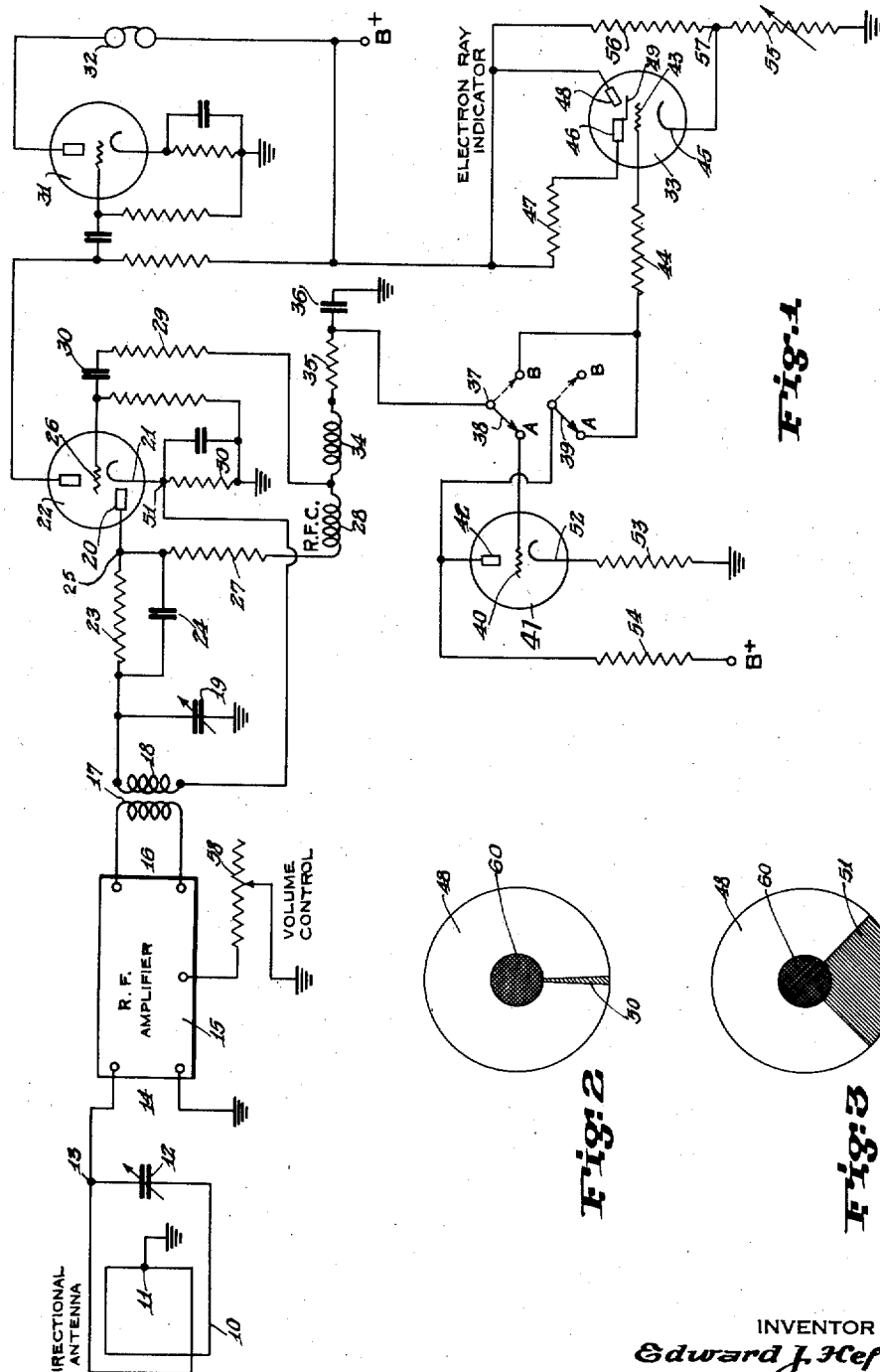
INVENTOR
Edward J. Hefele
BY
Samuel Ostrolenk
ATTORNEY Patented Dec. 31, 1940

2,226,929

UNITED STATES PATENT OFFICE 2,226,929

DIRECTION FINDING SYSTEM

Edward J. Hefele, Amityville, N. Y.

Application October 23, 1936, Serial No. 107,209

6 Claims. (Cl. 250—11)

This invention relates to direction finding systems and more particularly relates to novel methods of and means for obtaining directional bearings on radio transmitting stations.

The directional reception characteristic of a loop antenna is well known and widely used for obtaining accurate directional indications at points remote from transmitting stations. The radio signals are intercepted by the loop antenna, amplified and introduced to an aural or visual indicator to apprise the operator of the "null" or "maximum" positions of loop reception. The reception by the loop is "null" or zero when the plane of the loop is perpendicular to the direction of the transmitted radio waves, is a maximum when the plane of the loop is in the direction of the radio waves, and has intermediate values varying with the angular position of the loop antenna. An indicator or pair of earphones is generally employed at the audio frequency stages of the receiver and the intensity of the audio frequency signal is used to determine the "null" or "maximum" reception positions of the loop to in turn determine the direction of the transmitter.

Unless the indicator has sufficient sensitivity, the loop may be rotated over several degrees at the null indication, which direction must accordingly be interpolated. Distant stations weakly affect the indicator, and interference and noises tend to destroy the directional accuracy. Prior indicators, particularly those of the needle type, are affected by the modulation of the signal and together with transient noises such as static, seriously impair the utility of the direction finder, especially on weak signal reception.

In accordance with my present invention, I contemplate employing an electron-ray indicator to provide an extremely sensitive and inertialess unit for accurately indicating directional bearings. A high vacuum heater cathode type of tube has recently become available for visually indicating voltage conditions by means of a fluorescent target. The size of this tube is that of an ordinary vacuum tube and the operating potentials are within the range of most receiver circuits. The visual indication of this particular tube is that of a luminous annular area having a non-luminous or shadow sector varying in area in accordance with the intensity of a controlling voltage.

The electron-ray tube indicator has a self-contained triode amplifier, to the grid of which I connect rectified signals varying in accordance with the radio signals received by the directional antenna. In one modification of my present invention, the null reception position of the loop results in a minimum or zero shadow angle, the angle of the shadow area increasing with increasing signal intensity as received by the loop. The sensitivity of this circuit may readily be designed so that a few degrees of departure of the loop from null results in a maximum change of shadow area from zero to full shadow. The maximum shadow area of a particular electron-ray tube used is ninety degrees. In another modification, "null" reception produces a full or ninety degree shadow area, which area diminishes as the loop positions depart from true null.

I have found that the visual indicator of my present invention provides accurate bearing indications on radio stations which cannot be heard aurally on sensitive earphone direction finders. Another advantage of my present invention is the material reduction in the effects of signal modulation and transient noise such as static on the directional indications. The circuit connections to the electron-ray tube indicator of my invention are direct current connections so that the indicator may be readily situated on the dashboard of the vehicle at a position remote from the receiver. The indicator tube is inexpensive, rugged, inertialess and readily replaceable.

It accordingly is an object of my present invention to provide novel methods of and means for directional indication.

It is another object of my present invention to provide a novel direction finder indicator.

It is a further object of my present invention to provide a novel sensitive, inertialess indicator on which modulation and transient noise effects have negligible effect in impairing directional accuracy.

These and other objects of my invention will become apparent in the following description taken in connection with the drawing in which:

Figure 1 is a circuit diagram of a preferred embodiment for a directional receiver embodying the principles of my present invention.

Figure 2 is a front view of the fluorescent indicator with a small shadow sector.

Figure 3 is a front view of the fluorescent indicator with a maximum shadow sector.

Referring to Figure 1, a directional antenna 10 which is preferably a balanced loop antenna having its midpoint 11 grounded, is tuned by a variable condenser 12 shunted across the loop to the radio station on which directional bearings are desired. One terminal 13 of the loop is connected to the input 14 of the radio frequency amplifier 15. Amplifier 15 may be a multi-stage tuned radio frequency amplifier or a superheterodyne amplifier embodying the radio frequency and intermediate frequency stages. The output 16 of radio frequency amplifier 15 is connected to the primary of coupling transformer 17. The secondary 18 of transformer 17 is tuned by variable condenser 19 and connected to the diode rectifier 20—21 of the diode-triode stage 22.

A resistor 23 shunted by capacitance 24 is connected in series between the transformer secondary 18 and the electrode 20 of the diode rectifier. The direct current component of the rectified radio frequency carrier together with audio frequency modulations, if present, develop a corresponding uni-directional voltage across the resistor 23. The direct current component of the voltage is such that point 25 adjacent electrode 20 is negative in polarity with respect to the potential of the cathode 21.

The audio frequency component of the rectified signal is impressed upon the grid electrode 26 of the triode amplifier section of tube 22 by means of resistance 27, radio frequency choke 28, and coupling resistance 29 and condenser 30. The audio frequency corresponding to the modulation of the received signal is further amplified by triode amplifier stage 31, in the output circuit of which is shown connected headphones 32 for aural reception of the signals. Accordingly, the directional receiver of my present invention is adapted for aural reception of beacon or other radio stations as well as useful for directional indications in conjunction with the operation of loop antenna 10 and the electron-ray indicator 33.

In the preferred embodiment of my present invention, the direct current component of the rectified radio frequency signals is amplified by an odd number of direct current amplifier stages and used to actuate the electron-ray indicator 33 so that no reception by the loop produces a zero or minimum shadow angle. A simple filter composed of inductance 34, resistance 35 and capacitance 36 serves to filter the rectified potential to yield a substantially unvarying direct current potential at point 37, the amplitude of which depends upon the strength of the received radio frequency signals and the orientation of the directional antenna 10 with respect to the signals. Switches 38 and 39 are shown thrown in the A position of reception corresponding to the zero shadow angle as the null indication. With the switch in the A position, the rectified direct current potential is impressed upon the grid 40 of the triode direct current amplifier stage 41. The anode 42 of amplifier 41 is connected to the control grid 43 of the electron-ray indicator 33 in series with a current limiting resistor 44, the purpose of which will hereinafter be described.

The electron-ray indicator 33 is essentially as already known in the electron art, a miniature cathode ray indicator having a self-contained triode amplifier. The triode amplifier section of tube 33 comprises the control grid 43, indirectly heated cathode 45, and anode 46. The anode potential source B+ is connected to anode 46 through resistor 47 through which the anode current flows as controlled by the potential of the grid 43. The fluorescent coated metallic electrode 48 is at B+ potential and accordingly attracts electrons to illuminate its externally visible surface. Electrode 48 a full view of which is indicated in Figures 2 and 3, may take the shape of an annular ring. A ray control electrode 49, directly connected to anode 46, is interposed between the cathode and the fluorescent anode 48 and produces shadow sectors 50 and 51 upon the fluorescent area 48, the shadow area depending upon the potential of the signal introduced to the grid 43 with respect to the cathode 45.

In one practical form of the electron-ray indicator 33, the central section within the annular target 48 contains a dark non-luminous shield 60 which shields the filament and heated cathode within the tube from external view. The annular screen 48 normally fluoresces in operating condition and appears as a bright luminous ring. The shadow produced on the fluorescent screen is caused by preventing electrons from impinging thereon and has the shape of a dark sector of variable angle or area surrounded by the fluorescent surface.

When grid 43 is made negative with respect to cathode 45, the anode current flowing through resistor 47 is reduced to decrease the potential difference between target 48 and ray control electrode 49. When control electrode 49 approaches the potential of target 48, it has less effect in deflecting electrons from reaching the target 48 and accordingly the shadow angle is reduced. A predetermined negative bias condition of grid 43 with respect to cathode 45, for example eight volts, corresponds to a zero shadow angle indication on the fluorescent screen 48.

The parameters of the circuit of my present invention are adjusted, in this modification, to produce the eight volt negative bias condition of the grid 43 with zero signal input to the radio frequency amplifier 15, corresponding to the null reception condition on loop 10. In a particular embodiment, the following voltage conditions prevail: The self-biasing resistor 50 of the diode-triode stage 22 is selected to give a 1.5 volt bias for the triode section of the tube, thus placing the cathode 21 and point 51 at +1.5 volts with respect to ground. The cathode 52 of the direct current amplifier stage 41 is also placed at +1.5 volts above ground potential by means of the resistor 53 connected in series between cathode 52 and ground, if zero bias condition is desired for the grid 40 of stage 41. Since grid 40 is conductively connected to point 51, it is placed at +1.5 volts with respect to ground on account of the biasing resistor 50. The bias of cathode 52 is accordingly preferably adjusted to neutralize this condition. The potential of anode 42 is adjusted to thirty volts with respect to ground with the zero grid bias condition of stage 41. This is accomplished by using a proper anode resistor 54 connected in series between anode 42 and the B potential source. Accordingly, with a zero bias condition on direct current amplifier stage 41, a thirty volt drop exists between anode 42 and ground.

Since the control grid 43 of the electron-ray indicator 33 is conductively connected to anode 42, it assumes the +30 volt potential of this anode with respect to ground. The potential of cathode 45 is adjusted to provide the —8 volt bias condition at the input stage of electron-ray tube 33 in order to have a zero shadow with "null" or zero signal input condition. I provide for this adjustment by means of the potentiometer arrangement comprising the variable resistance 55 and fixed resistance 56 connected in series between the target 48 and ground. The cathode 45 is connected to point 57 and assumes the potential of that point. The potential of point 57 depends upon the division of the B+ potential determined by the ratio of resistances 55 and 56 and also the drop in voltage in resistance 55 due to the electron stream flow through tube 33. Resistance 55 is essentially a focusing resistance since it controls the bias conditions of the indicator tube and therefore determines the shadow angle indications.

With control grid 43 normally at thirty volts, a zero shadow angle will result by making cathode 45 +38 volts above ground. This is accomplished by either reducing the signal input to diode 20—21 to zero by suitable adjustment of the radio frequency amplifier volume control 58 or focusing the shadow when the loop 10 is known to be in a null position. A rectified signal impressed upon diode rectifier 20—21 will produce a direct current component drop across resistance 23, decreasing the potential of point 25 with respect to ground. The direct current component filtered by filter 35—36 of the audio frequency modulations, is directly impressed upon control grid 40 of the direct current amplifier stage 41. The grid 40 is accordingly made negative with respect to cathode 52, decreasing the anode current flowing through resistor 54 and consequently increasing the potential of anode 42. The increase of anode 42 potential with respect to ground correspondingly raises the potential of control grid 43 closer to that of cathode 45. The shadow angle upon the fluorescent screen 48 is increased from the null or minimum size 50 corresponding to null reception as shown in Figure 2, to the maximum area 51 corresponding to zero grid bias conditions as shown in Figure 3. The null condition of reception is sharply defined by this visual indication and a minimum or zero "null" shadow condition 50 (Figure 2) may be readily made to correspond to zero signal input by the adjustment of focusing resistance 55. The maximum shadow angle 51 may correspond to reception conditions a few degrees of the loop away from null dependent upon the signal strength of the received signals and the amplification employed in the receiver.

When the voltage of grid 43 equals that of cathode 45 to yield zero bias, the maximum shadow is produced on indicator 48. Further increase of the grid 43 potential will make it positive with respect to cathode 45 and some grid current will flow. The shadow indication will remain ninety degrees or maximum during the positive bias conditions. A resistor 44 connected in series between anode 42 and grid 43 is used to minimize the grid current flow which has no harmful effects.

The electron-ray indicator 33 may be mounted remote from the receiver circuit and placed on the dashboard near the operator of the vehicle it is installed upon. Since only direct current potentials are connected to indicator 33, no problems of shielding or phasing are required. The over-all sensitivity of the indication is controlled by the volume control 58 shown schematically connected to the radio frequency amplifier 15 designed according to principles well established in the radio art. Substantially no signal modulations reach the electron-ray indicator 33 due to the filtering thereof. The direct current amplifier stage 41 serves as a phase inverter to change the phase of the uni-directional signal variations at point 25 of the rectifier 180° in order to suitably control the electron-ray indicator 33 to provide the null shadow for null reception indications. It is to be understood that an odd number of direct current amplifier stages may be used instead of stage 41 to further increase the over-all sensitivity of directional indications.

In a modification of my present invention, I provide for a maximum shadow angle indication for no reception, and reduce the shadow angle indication with increasing signal reception. This is accomplished by throwing switch 38—39 to the B position. This connects the rectified uni-directional signals directly to the electron-ray indicator 33 circumventing the direct current amplifier and phase inverter stage 41. The filtered uni-directional signals from point 37 are connected through resistance 44 to the control grid 43. The nominal potential of point 37 being +1.5 volts above ground due to the self-biasing resistor 50, the nominal potential of grid 43 is accordingly placed at +1.5 volts above ground. For position B, the focusing resistor 55 is preferably adjusted to make the potential of cathode 45 +1.5 volts above ground to provide a zero bias condition for grid 43. This adjustment is readily made by placing a zero signal input upon diode 20—21 and reducing the potential of cathode 45 by the variation of resistance 55 until the maximum shadow angle begins to decrease in area. With this adjustment, corresponding to "null" loop reception, the shadow area diminishes with increasing signal intensity since the corresponding increasing negative potential of point 25 and therefore point 37 and also grid 43 becomes more negatively biased. Accordingly, in position B departure from null will be visually evident as a zero or intermediate shadow angle indication upon fluorescent screen 48 and null condition of reception will be evident as a maximum shadow angle corresponding to the illustration of Figure 3.

Although I have presented particular circuit arrangements in setting forth my present invention, it is to be understood that modifications may be made by those skilled in the art which fall within the broader spirit and scope thereof and accordingly, I do not intend to be limited except as set forth in the appended claims.

I claim:

1. In a radio direction indicator system, a rotatable directional antenna for receiving transmitted radio signals with intensity in accordance to the angular position of the antenna with respect to the signal waves; means connected to said antenna for amplifying said signals; means for rectifying said signals to produce corresponding direct current signals; means for reversing the polarity of and amplifying the direct currents comprising an odd number of amplifier stages, the input of said amplifier stages being connected to said rectifying means; and electronic means comprising an evacuated envelope containing a fluorescent element, a source of electrons arranged to impinge on said element to produce a luminous image thereon, and an electrode responsive to said direct current signals for controlling the area of said luminous image whereby a minimum shadow occurs for minimum signal reception.

2. In a radio direction indicator system, a rotatable directional antenna for receiving transmitted radio signals with intensity in accordance to the angular position of the antenna with respect to the signal waves; means connected to said antenna for amplifying said signals; means for rectifying said signals to produce corresponding direct current signals; means for reversing the polarity of the direct currents comprising a direct current amplifier stage, the input of said amplifier stage being conductively connected to said rectifying means; and electronic means comprising an evacuated envelope containing a fluorescent element, a source of electrons arranged to impinge on said element to produce a luminous image thereon, and an electrode responsive to said direct current signals for controlling the size of said luminous image whereby a minimum shadow occurs for minimum signal reception.

3. In a radio direction indicator system, a rotatable directional antenna for receiving transmitted radio signals with intensity in accordance to the angular position of the antenna with respect to the signal waves; means connected to said antenna for amplifying said signals; means for rectifying said signals to produce corresponding direct current signals; means for reversing the polarity of and amplifying the direct current signals comprising an amplifier stage, the input of said amplifier stage being connected to said rectifying means; and electronic means for indicating the relative angular position of the antenna with respect to the signal waves comprising an evacuated envelope containing a fluorescent coated conductive target, an amplifier section including cathode, anode and grid electrodes, and an image control electrode for varying the image on the fluorescent target in accordance with said rectified signals, said grid electrode being conductively connected to the output of said direct current amplifier stage whereby a maximum luminous image occurs for minimum signal reception.

4. In a radio directional receiver, a rotatable loop antenna for absorbing transmitted radio signals with intensity in accordance to the angular position of the antenna with respect to the signal waves; a radio frequency amplifier connected to said antenna for amplifying said signals; means for rectifying said signals comprising a detector stage having an anode and a cathode, connected to said amplifier; means for reversing the polarity of and amplifying the rectified currents comprising a direct current amplifier stage, the input of said amplifier stage being connected to said detector anode; and electronic means comprising an evacuated envelope containing a fluorescent element, a source of electrons arranged to impinge on said element to produce a luminous image thereon, and an electrode responsive to said polarity reversed rectified signals for controlling the size of said luminous image whereby a minimum shadow occurs for minimum signal reception.

5. In a radio directional receiver, a rotatable loop antenna for absorbing transmitted radio signals with intensity in accordance to the angular position of the antenna with respect to the signal waves; a radio frequency amplifier connected to said antenna for amplifying said signals; means for rectifying said signals comprising a detector stage having an anode and a cathode, connected to said amplifier; means for reversing the polarity of and amplifying the rectified currents comprising a direct current amplifier stage, the input of said amplifier stage being connected to said detector anode; means controlled by the rectified signals for indicating the relative angular position of the antenna with respect to the signal waves comprising an evacuated envelope containing a fluorescent conductive target, an amplifier section including cathode, anode and grid electrodes, and an image control electrode for varying the size of the image on the fluorescent target in accordance with said rectified signals, said grid electrode being conductively connected to the output of said direct current amplifier stage whereby a maximum luminous image occurs for minimum signal reception.

6. In a radio directional receiver, a rotatable loop antenna for absorbing transmitted radio signals with intensity in accordance to the angular position of the antenna with respect to the signal waves; a radio frequency amplifier connected to said antenna for amplifying said signals; means for rectifying said signals comprising a detector stage having an anode and a cathode, connected to said amplifier; means for filtering said rectified signals to produce substantially direct current of amplitude dependent upon the strength of said absorbed signals; means for reversing the polarity of and amplifying said direct currents comprising an amplifier stage, the input of said amplifier stage being connected to said filtering means; and means controlled by the reversed direct current signals for indicating the relative angular position of the antenna with respect to the signal waves comprising an evacuated envelope containing a fluorescent coated conductive electrode, a triode amplifier section including cathode, anode and grid electrodes, and a fluorescent image control electrode connected to said amplifier anode for varying the extent of the image on the fluorescent electrode in accordance with the amplitude of said rectified signals, said grid electrode being conductively connected to the output of said polarity reversing means whereby a maximum luminous image occurs for minimum signal reception.

EDWARD J. HEFELE.